United States Patent [19]

Brailean

[11] Patent Number: 5,802,218
[45] Date of Patent: Sep. 1, 1998

[54] METHOD, POST-PROCESSING FILTER, AND VIDEO COMPRESSION SYSTEM FOR SUPPRESSING MOSQUITO AND BLOCKING ATRIFACTS

[75] Inventor: James Charles Brailean, Park Ridge, Ill.

[73] Assignee: Motorola, Inc., Schaumburg, Ill.

[21] Appl. No.: 334,718

[22] Filed: Nov. 4, 1994

[51] Int. Cl.$^6$ .................................................. G06K 9/40
[52] U.S. Cl. .......................... 382/275; 382/236; 382/261
[58] Field of Search ........................... 382/275, 236, 382/250, 261, 265, 233, 268, 279; 348/420, 409, 415, 416, 413, 404; 358/430, 433; 395/128

[56] References Cited

U.S. PATENT DOCUMENTS

| | | | |
|---|---|---|---|
| 4,941,043 | 7/1990 | Jass | 348/404 |
| 5,136,376 | 8/1992 | Yagasaki | 348/409 |
| 5,461,655 | 10/1995 | Vuylsteke | 395/128 |
| 5,500,685 | 3/1996 | Kokaram | 382/275 |
| 5,512,956 | 4/1996 | Yan | 348/413 |
| 5,561,611 | 10/1996 | Avinash | 382/279 |
| 5,610,729 | 3/1997 | Nakajima | 358/430 |

OTHER PUBLICATIONS

Tsann-Shyong Liu & Nikil Jayant, "Adaptive Post-Processing Algorithms for Low Bit Rate Video Signals", Proceedings IEEE International Conference on Acoustic, Speech & Signal Processing, 1994, pp. V-401-V-404.

Yongyi Yang, N.P. Galatsanos, & A.K. Katsaggelos, "Iterative Projection Algorithms for Removing the Blocking Artifacts of Block-DCT Compressed Images", Proceedings IEEE International Conference on Acoustic, Speech & Signal Processing, 1993, pp. V-405-V-408.

Robert L. Stevenson, "Reduction of Coding Artifacts in Transform Image Coding", Proceedings IEEE International Conference on Acoustic, Speech & Signal Processing, 1993, pp. V-401-V-404.

Torbjorn Kronander, "Post-and Pre-Processing Coding of Image Sequences Using Filters with Motion Compensated History", Proceedings IEEE International Conference on Acoustic Speech & Signal Processing, 1988, pp. 1104-1107.

Primary Examiner—Dwayne D. Bost
Assistant Examiner—Brian L. Johnson
Attorney, Agent, or Firm—Darleen J. Stockley

[57] ABSTRACT

The visibility of mosquito and blocking artifacts in a video compression system (200) are effectively suppressed by calculating a post-processed pixel intensity. A post-processed pixel intensity is determined (100) using a predetermined noise variance, a predetermined autocorrelation coefficient, and a local neighborhood of pixels that includes a plurality of previously post-processed pixel intensities and a plurality of original pixel intensities. This eliminates the dependency on local signal and noise power estimates.

7 Claims, 3 Drawing Sheets

100

METHOD, POST-PROCESSING FILTER, AND VIDEO COMPRESSION SYSTEM FOR SUPPRESSING MOSQUITO AND BLOCKING ATRIFACTS

FIELD OF THE INVENTION

The present invention relates generally to video compression systems, and more particularly to suppression of mosquito and blocking artifacts in a video compression system.

BACKGROUND

In video compression systems, the number of bits required to represent a single frame in a video sequence can be reduced by taking advantage of the similarities that the single frame has with previous frames. Methods such as a hybrid block motion compensated discrete cosine transform, DCT, encoding scheme have been used to achieve very high compression ratios, but these methods also introduce artifacts which severely degrade the visual quality of the decoded sequence.

The two types of artifacts introduced are mosquito artifacts and blocking artifacts. Mosquito artifacts are defined as temporally nonstationary impulses that appear around objects which are moving within the decompressed video. These artifacts result from the coarse quantization of the prediction error signal. The majority of the energy contained in a prediction error signal is the result of the motion estimator's inability to distinguish between differently moving objects. For instance, in video conferencing applications the subject is generally against a stationary background. Since the motion estimator tries to match blocks of pixels between temporally adjacent frames, the boundaries between moving objects and stationary background that fall within these blocks cannot be detected. This leads to the situation where either part of the background is assumed to be moving, or part of the moving object is assumed to be stationary. Coarsely quantizing these prediction errors results in impulsive artifacts that change over time and tend to swarm around the moving object, similar in manner to a mosquito.

Blocking artifacts are defined as the introduction of artificial block boundaries into the decoded video sequence. These artifacts are due to the combination of dividing the prediction error signal into blocks, as well as quantization. That is, since there exists an inverse relationship between spatial extent and frequency extent analogous to the inverse relationship that exists between time and frequency extent in Fourier analysis, the quantization errors that occur in the DCT domain are smeared across the corresponding spatial block. Furthermore, since each block is quantized separately, the errors are most visible at the block boundaries.

Since both of these artifacts occur at specific locations and not uniformly throughout the video sequence, post-processing filters, designed to reduce both artifacts, must be spatially adaptive. Spatially adaptive filters have been used to suppress these artifacts, but they rely on local signal and noise power estimates to alter their responses. Several problems exist with this design. For instance, estimation of the noise power based on the quantization step size is not a reliable indicator as to the spatial location of mosquito and blocking artifacts within the decompressed video. Over-smoothing or blurring of the decompressed video occurs due to inaccurate estimates of the decompressed video's signal-to-noise ratio, SNR. While enhancement of the blocking artifacts can result from the incorrect classification of block boundaries as object edges within the decompressed video. The effect of any one of these problems on the perceived visual quality of the decompressed video is disastrous.

A further consideration is that users of compressed video demand that the decoder be able to resize the video display window to any specified size. To provide a user with this capability, requires the decoder to perform an additional, with regards to removing coding artifacts, post-processing operation involving data interpolation or decimation. An important requirement is that this resize operation must be computationally efficient and provide a resize sequence that is visually appealing. That is, artifacts should not be introduced into the video sequence as a result of the resizing operation. Furthermore, coding artifacts should not become more visible in the decoded sequence due to the resizing operation.

Thus, there is a need for a method, post-processing filter, and video compression system which suppress mosquito and blocking artifacts independent of local signal to noise power ratio estimates, while also providing the ability to resize the decompressed video.

DETAILED DESCRIPTION OF A PREFERRED EMBODIMENT

The present invention allows a post-processing filter in a video compression system to suppress mosquito and blocking artifacts and to be independent of local signal and noise power estimates. A signal variance is estimated based on a local neighborhood of pixels. The local neighborhood of pixels includes a plurality of previously post-processed pixel intensities and a plurality of original pixel intensities. An optimal filter gain is calculated based on the signal variance, a predetermined noise variance, and a predetermined autocorrelation coefficient. A post-processed pixel intensity is determined using the predetermined autocorrelation coefficient, the local neighborhood of pixels, and the optimal filter gain. Also, if desired, a post-processed resized pixel intensity is determined using the predetermined autocorrelation coefficient, the local neighborhood of pixels, the optimal filter gain, and plurality of interpolation coefficients. This eliminates the dependency on local signal to noise power ratio estimates, while providing the user with the ability to resize and post-process the decompressed video.

Figure 1:
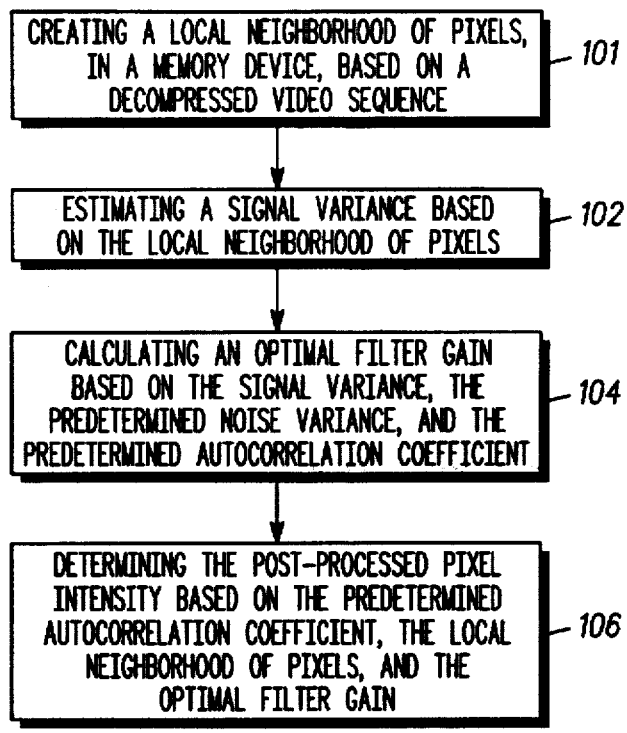
FIG. 1 is a flow chart of steps implemented by a post-processing filter which suppresses mosquito and blocking artifacts in accordance with the present invention.

The present invention is more fully described with reference to FIGS. 1–5. FIG. 1, numeral 100, is a flow chart of steps implemented by a post-processing filter which suppresses mosquito and blocking artifacts in accordance with the present invention. First, a local neighborhood of pixels is created, in a memory unit, based on a decompressed video sequence (101). Then, a signal variance is estimated based on a local neighborhood of pixels (102). An optimal filter gain is then calculated using the signal variance, a predetermined noise variance, and a predetermined autocorrelation coefficient (104). Finally, a post-processed pixel intensity is determined based on the predetermined autocorrelation coefficient, the local neighborhood of pixels, and the optimal filter gain (106).

When resizing of the decompressed video window is required, the post-processed pixel intensity is a resized post-processed pixel intensity based on a plurality of predetermined interpolation coefficients. This is accomplished by combining the resizing operation with the post-processing filter described above. The post-processed pixels are removed from the local neighborhood and replaced with decompressed pixels. The parameters described above, the signal variance based on a local neighborhood of pixels and the optimal filter gain based on the signal variance, a predetermined noise variance, and a predetermined autocorrelation coefficient, are combined with a plurality of interpolation coefficients to form the coefficients of this combined resize post-processed filter. Finally, a resized post-processed pixel intensity is determined based on the predetermined autocorrelation coefficient, the local neighborhood of pixels, the optimal filter gain, and plurality of interpolation coefficients.

The signal variance may be estimated by using an equation of the form:

$$\hat{\sigma}_s^2(n) = \frac{1}{2M+1}\left[\sum_{i=-M}^{0}(x(n-i))^2 + \sum_{i=1}^{M}(\hat{y}(n-i))^2\right] - \hat{m}_s^2(n),$$

where $$\hat{m}_s(n) = \frac{1}{2M+1}\left[\sum_{i=-M}^{0}x(n-i) + \sum_{i=1}^{M}\hat{y}(n-i)\right]$$

is the average intensity value in the (2M+1) local neighborhood of pixels, $\hat{y}(n)$ is a previously post-processed pixel intensity in the local neighborhood of pixels, and $x(n)$ is a decompressed pixel intensity in the local neighborhood of pixels. The optimal filter gain may be calculated by using an equation of the form:

$$G(n) = \frac{\alpha \cdot \sigma_s^2(n)}{\sigma_n^2 + \alpha \cdot \sigma_s^2(n)}$$

where $$\alpha = 1 - \frac{2 \cdot \zeta^2}{1+\zeta^2}$$

and where $\sigma_n^2$ is the noise variance, $\sigma_s^2(n)$ is the signal variance at pixel location n, and $\zeta$ is the predetermined autocorrelation coefficient. A typical range for the noise variance is $0 < \sigma_n^2 < 10$. A typical range for the autocorrelation coefficient is $0.9 < \zeta < 1.0$. The post-processed pixel intensity may be based on an estimate of the intensity of a pixel. The estimate of the intensity of a pixel is a function of the predetermined autocorrelation coefficient, a decompressed pixel intensity of a next pixel relative to a predetermined scanning direction, and an immediately previously post-processed pixel intensity. The estimate of the intensity of a pixel may be determined by using an equation of the form:

$$\hat{y}_a(n) = \frac{\zeta}{1+\zeta^2} \cdot [\hat{y}_b(n-1) + x(n+1)]$$

where $\hat{y}_a(n)$ is the estimate of the intensity of a pixel, $\zeta$ is the predetermined autocorrelation coefficient, $x(n+1)$ is the decompressed pixel intensity of a next pixel relative to a predetermined scanning direction, and $\hat{y}_b(n-1)$ is an immediately previously post-processed pixel intensity. The post-processed pixel intensity may determined by using an equation of the form:

$$\hat{y}_b(n) = \hat{y}_a(n) + G(n) \cdot [x(n) - \hat{y}_a(n)]$$

where $G(n)$ is the optimal filter gain, $\hat{y}_a(n)$ is the estimate of the intensity of a pixel in the local neighborhood of pixels, and $x(n)$ is the decompressed pixel intensity in the local neighborhood of pixels.

For the generalized resizing filter of the form:

$$y(m) = C_0 \cdot x(n) + C_1 \cdot x(n+1) + C_{-1} \cdot x(n-1) + C_2 \cdot x(n+2) + C_{-2} \cdot x(n-2) + \ldots$$

where $y(m)$ is the resized decompressed pixel located between $x(n)$ and $x(n+1)$ and $C_i$ is a predetermined interpolation coefficient which is dependent on the interpolation or decimation method, the following equation is used to determine the resized post-processed pixel:

$$\hat{y}_b(m) = [C_{-1} \cdot g(n) + C_0 \cdot (1 - g(n)) \cdot B]x(n-1) + \\
[C_0 \cdot g(n) + (1 - g(n)) \cdot (C_{-1} \cdot \zeta + C_1 \cdot B]x(n) + \\
[C_1 \cdot g(n) + (1 - g(n)) \cdot (C_2 \cdot \zeta + C_0 \cdot B]x(n+1) + \\
[C_2 \cdot g(n) + C_1 \cdot (1 - g(n)) \cdot B]x(n+2) + \\
C_{-2} \cdot x(n-2) + C_3 \cdot x(n+3) + C_{-3} \cdot x(n-3) + \ldots$$

where $$B = \frac{\zeta}{1+\zeta^2},$$

where and $\hat{y}_b(m)$ is the resized post-processed pixel located between $x(n)$ and $x(n+1)$.

Figure 2:
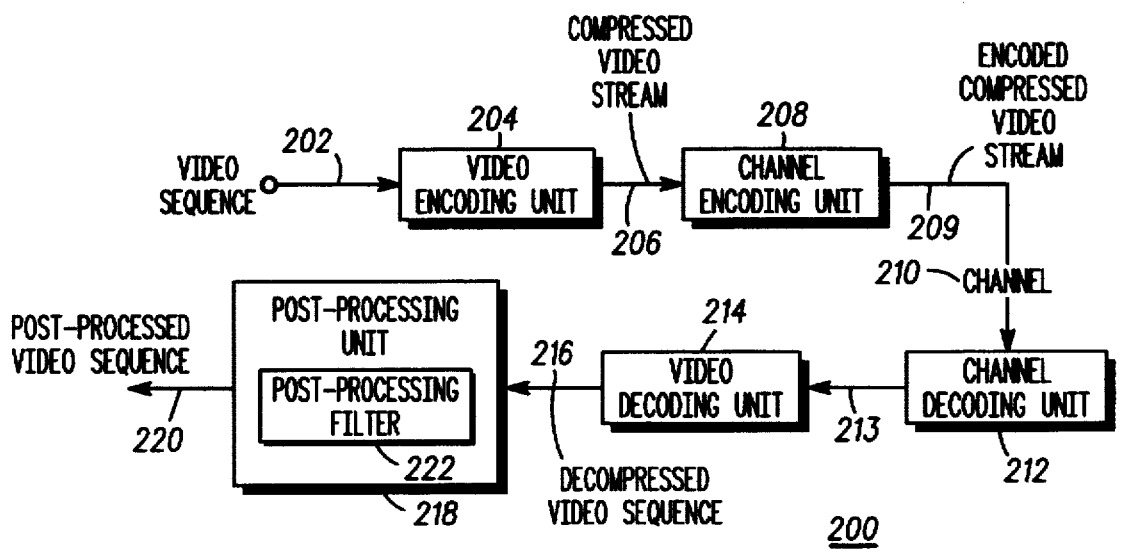
FIG. 2 is a block diagram of a video compression system that uses a post-processing filter which suppresses mosquito and blocking artifacts in accordance with the present invention.

FIG. 2, numeral 200, is a block diagram of a video compression system that uses a post-processing filter which suppresses mosquito and blocking artifacts in accordance with the present invention. The video compression system (200) includes a video encoding unit (204), a channel encoding unit (208), a channel (210), a channel decoding unit (212), a video decoding unit (214), and a post-processing unit (218) which includes a post-processing filter (222).

Redundant information contained within the input video sequence (202) is removed by the video encoding unit (204) generating the compressed video stream (206). The compressed video stream (206) is then encoded by the channel encoding unit (208) for efficient transmission over the channel (210) to the corresponding channel decoding unit (212). The channel decoding unit (212) decodes the received information and provides the video decoding unit (214) with the compressed video stream (213). Based on the compressed video stream (213), the video decoding unit (214) generates the decompressed video sequence (216). This decompressed video sequence (216) is the input to the post-processing unit (218), where the post-processing filter (222) is employed to remove the mosquito and blocking artifacts from the decompressed video resulting in the post-processed video sequence (220).

Figure 3:
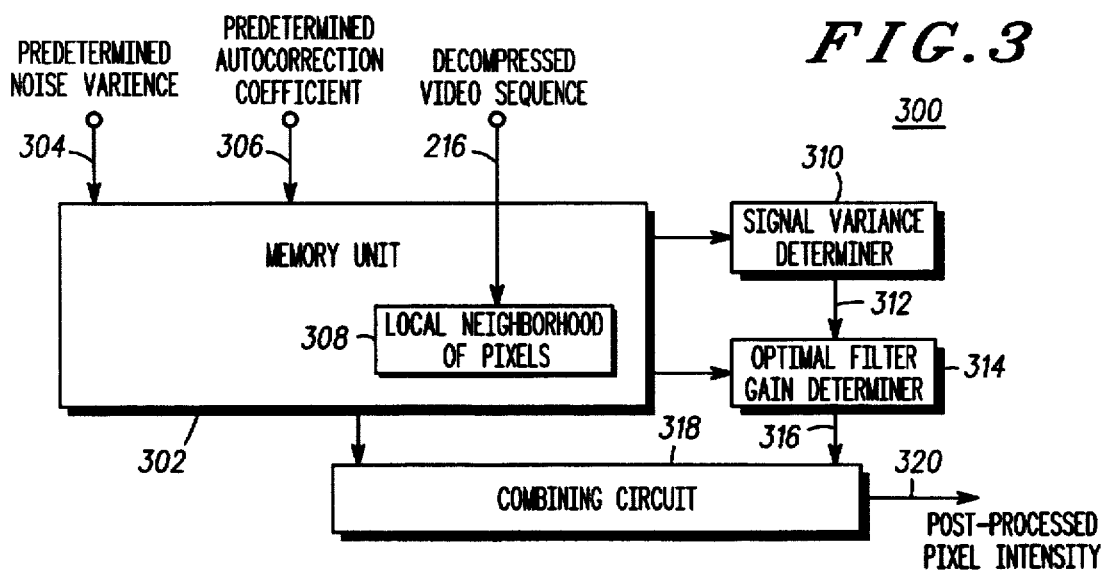
FIG. 3 is a block diagram of a post-processing filter which suppresses mosquito and blocking artifacts in accordance with the present invention.

FIG. 3, numeral 300, is a block diagram of a post-processing filter which suppresses mosquito and blocking artifacts in accordance with the present invention. The post-processing filter (222) comprises a memory unit (302), a signal variance determiner (310), an optimal filter gain determiner (314), and a combining circuit (318). The memory unit (302) receives and stores a predetermined noise variance (304), a predetermined autocorrelation coefficient (306), and a decompressed video sequence (216). The decompressed video sequence (216) is stored as a local neighborhood of pixels (308).

The predetermined noise variance stored in the memory unit (302) is typically a value between 1 and 10. The signal variance determiner (310) estimates the signal variance (312) based on the local neighborhood of pixels (308). The optimal filter gain determiner (314) determines an optimal filter gain (316) based on the signal variance (312), the predetermined noise variance (304), and the predetermined autocorrelation coefficient (306). The combining circuit (318) determines the post-processed pixel intensity (320) based on the predetermined autocorrelation coefficient (306), the local neighborhood of pixels (308), and the optimal filter gain (316). The combining circuit (318) may be implemented as an infinite impulse response (IIR) filter or a finite impulse response (FIR) filter.

Figure 4:
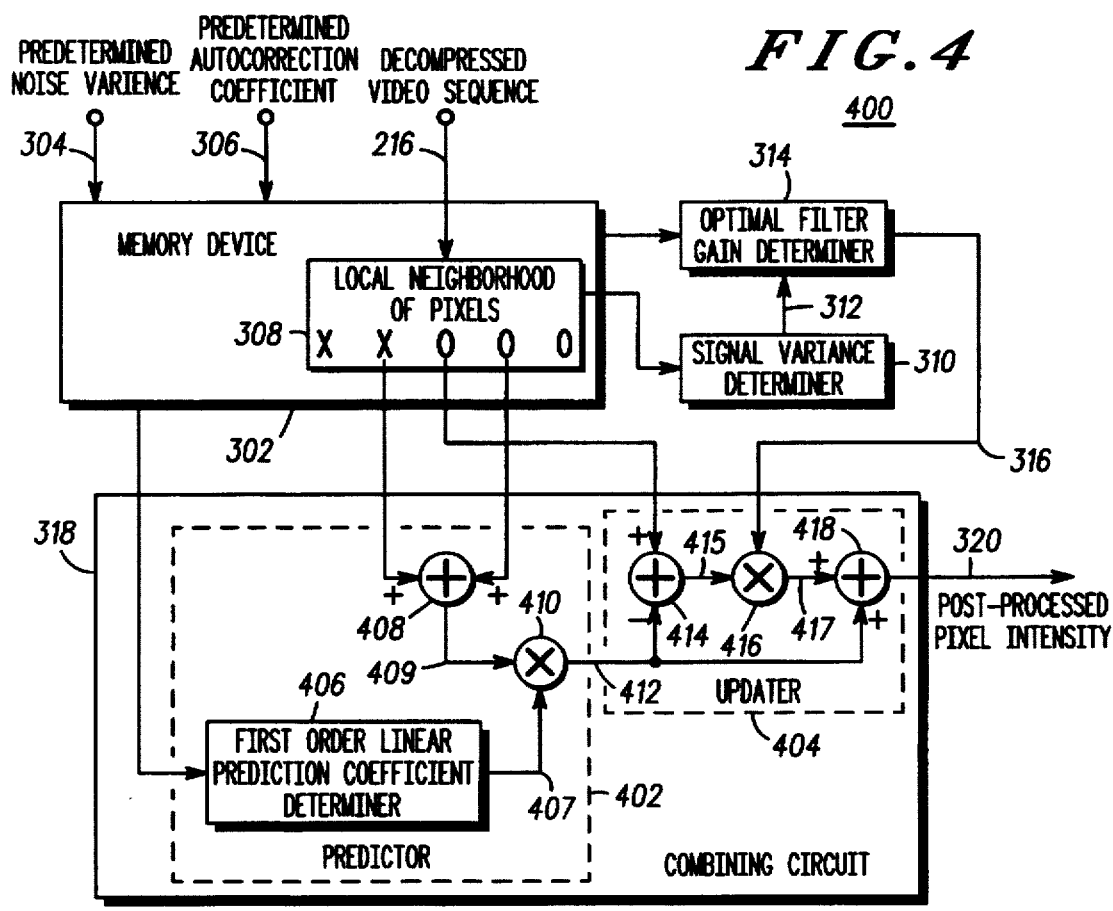
FIG. 4 is a block diagram of a post-processing filter which suppresses mosquito and blocking artifacts, using a predictor and an updater, in accordance with the present invention.

FIG. 4, numeral 400, is a block diagram of a post-processing filter which suppresses mosquito and blocking artifacts, using a predictor (402) and an updater (404), in accordance with the present invention. The post-processing filter comprises a memory unit (302), a signal variance determiner (310), an optimal filter gain determiner (314), and a combining circuit (318). The memory unit (302) receives and stores a predetermined noise variance (304), a predetermined autocorrelation coefficient (306), and a decompressed video sequence (216). The decompressed video sequence (216) is stored as a local neighborhood of pixels (308). It should be noted that FIG. 4 reflects the case when M=2 which corresponds to the local neighborhood of pixels consisting of the five pixel elements indicated by the X's and O's. The choice of M is made at the time of implementation and is dependent on the amount of smoothness desired: the larger the M the more smoothing applied to the decompressed video. The X's and O's indicate which pixels are previously post-processed intensity pixels, X's, and which are decompressed intensity pixels, O's, assuming a left to right movement across each row of the image frame. Other methods can also be used for moving through the decompressed image frame stored in memory, such as from right to left across each row, top to bottom or bottom to top across each column.

The general operation of the block diagram shown in FIG. 4 is the same as the block diagram in FIG. 3 and more detail is shown for one implementation of the combining circuit (318). The combining circuit (318) comprises a predictor (402) and an updater (404). The predictor (402) predicts the intensity of the current pixel. The updater (404) determines the post-processed pixel intensity.

The predictor (402) uses a one-dimensional non-causal auto-regressive model of the local neighborhood of pixels (308). An adder (408) adds the first previous post-processed pixel ($\hat{y}_b(n-1)$) with the first decompressed pixel ($x(n+1)$) past the pixel under consideration ($x(n)$). The resultant of this operation is the sum of the current intensity levels (409) at these two pixel locations. The coefficient (407) provided by first order linear prediction coefficient determiner (406) is then used to multiply (410) the sum of intensities (409). This results in the estimate (412) of the original intensity at pixel location n. The estimate (412) is then compared (414) to the decompressed pixel intensity ($x(n)$). The output of this comparison (415) is then multiplied (416) by the output (316) of the optimal filter gain determiner (314). The output of this value (417) is summed with the estimate of the intensity value (412), using an adder (418), resulting in the post-processed pixel intensity (320).

Figure 5:
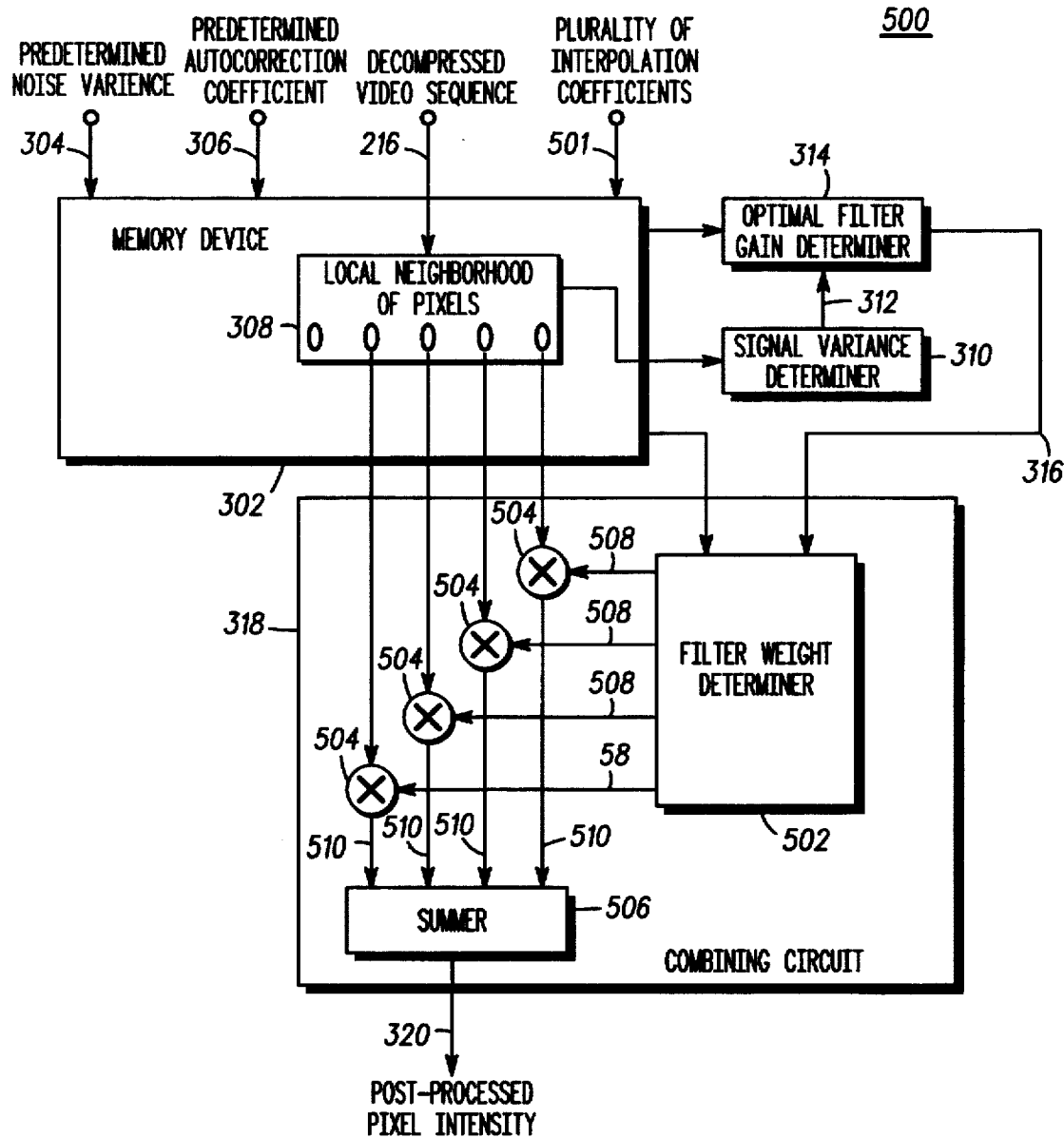
FIG. 5 is a diagram of a post-processing filter which suppresses mosquito and blocking artifacts and performs resizing in accordance with the present invention.

FIG. 5, numeral 500, is a diagram of a post-processing filter which suppresses mosquito and blocking artifacts and performs resizing in accordance with the present invention. The post-processing filter comprises a memory unit (302), a signal variance determiner (310), an optimal filter gain determiner (314), and a combining circuit (318). The memory unit (302) receives and stores a predetermined noise variance (304), a predetermined autocorrelation coefficient (306), and a decompressed video sequence (216). The decompressed video sequence (216) is stored as a local neighborhood of pixels (308). As in FIG. 4, FIG. 5 reflects the case when M=2 which corresponds to the local neighborhood of pixels consisting of the five pixel elements indicated by the O's. The choice of M is made at the time of implementation and is dependent on the amount of smoothness desired and the type of resize filter chosen: the larger the M the more smoothing applied to the decompressed video. The O's indicate which decompressed intensity pixels are to be used in the local neighborhood.

The memory unit (302) also stores a predetermined plurality of interpolation coefficients (501). The combining circuit (318) typically comprises a resize filter. The combining circuit (318) accesses the memory (302) once. The combining circuit (318) comprises a filter weight determiner (502), a plurality of multipliers (504), and a summer (506). The filter weight determiner (502) determines a plurality of filter coefficients (508). The plurality of multipliers (504) generates a plurality of weighted decompressed pixel intensities (510). The summer provides the post-processed pixel intensity (320).

The post-processing filters (400 and 500) may be implemented using a Digital Signal Processor (DSP) such as the MOTOROLA DSP56002 or an application specific integrated circuit (ASIC) and a Random Access Memory (RAM) unit. The memory unit (302) may be the RAM unit. The signal variance determiner (310), the optimal filter gain (314), and the predictor unit (402) may be implemented using the ASIC. The updater may be implemented using two adders (414 and 418) and a multiplier (416) within the ASIC.

The present invention provides a method and apparatus for removing both mosquito and blocking artifacts from a decompressed video sequence. With such a method and apparatus, it is possible to simultaneously resize the decompressed video while removing these artifacts. This method and apparatus has the following advantages over present post-processing filters: it is independent of signal-to-noise calculations, which are poor indicators of artifact locations; it can perform resizing and post-processing with a single call to memory; a higher perceived viewing quality is obtained.

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

I claim:

1. A method for obtaining a post-processed pixel intensity, for a frame in a decompressed video sequence residing in memory, using a filter which suppresses a visibility of a mosquito artifact and a blocking artifact based on a predetermined noise variance and a predetermined autocorrelation coefficient, comprising the steps of:

A) creating a local neighborhood of pixels, in a memory unit, based on the decompressed video sequence, wherein the local neighborhood of pixels includes a plurality of previously post-processed pixel intensities and a plurality of decompressed pixel intensities;

B) estimating a signal variance based on the local neighborhood of pixels;

C) calculating an optimal filter gain based on the signal variance, the predetermined noise variance, and the predetermined autocorrelation coefficient; and D) determining, using a summer, the post-processed pixel intensity based on the predetermined autocorrelation coefficient, the local neighborhood of pixels, and the optimal filter gain, wherein the post-processed pixel intensity is further based on an estimate of an intensity of a selected pixel, wherein the estimate of the intensity of the selected pixel is a function of the predetermined autocorrelation coefficient, a decompressed pixel intensity of a next pixel relative to a predetermined scanning, and direction, and an immediately previously post-processed pixel intensity, wherein the estimate of the intensity of the selected pixel is determined by using an equation of the form:

$$\hat{y}_a(n) = \frac{\zeta}{1+\zeta^2} \cdot [\hat{y}_b(n-1) + x(n+1)]$$

where $\hat{y}_a(n)$ is the estimate of the intensity of the selected pixel, $\zeta$ is the predetermined autocorrelation coefficient, $x(n+1)$ is a decompressed pixel intensity of a next pixel relative to a predetermined scanning direction, and $\hat{y}_b(n-1)$ is an immediately previously post-processed pixel intensity.

2. The method of claim 1, wherein the signal variance is estimated by using an equation of the form:

$$\hat{\sigma}_s^2(n) = \frac{1}{2M+1} \left[ \sum_{i=-M}^{0} (x(n-i))^2 + \sum_{i=1}^{M} (\hat{y}(n-i))^2 \right] - \hat{m}_s^2(n)$$

where $$\hat{m}_s(n) = \frac{1}{2M+1} \left[ \sum_{i=-M}^{0} x(n-i) + \sum_{i=1}^{M} \hat{y}(n-i) \right],$$

is an average intensity value in the local neighborhood of pixels, (2M+1) a neighborhood size, and is $\hat{y}(n)$ is a previously post-processed pixel intensity in the local neighborhood of pixels.

3. The method of claim 1, wherein the optimal filter gain is calculated by using an equation of the form:

$$G(n) = \frac{\alpha \cdot \sigma_s^2(n)}{\sigma_n^2 + \alpha \cdot \sigma_s^2(n)}$$

where $$\alpha = 1 - \frac{2 \cdot \zeta^2}{1+\zeta^2}$$

and where $\sigma_n^2$ is the predetermined noise variance, $\sigma_s^2$ is the signal variance, and $\zeta$ is the predetermined autocorrelation coefficient.

4. The method of claim 1, wherein the post-processed pixel intensity is a resized post-processed pixel intensity based on a plurality of predetermined interpolation coefficients.

5. The method of claim 4, wherein memory is accessed one time for determining the resized post-processed pixel intensity.

6. A method for obtaining a post-processed pixel intensity, for a frame in a decompressed video sequence residing in memory, using a filter which suppresses a visibility of a mosquito artifact and a blocking artifact based on a predetermined noise variance and a predetermined autocorrelation coefficient, comprising the steps of:

A) creating a local neighborhood of pixels, in a memory unit, based on the decompressed video sequence, wherein the local neighborhood of pixels includes a plurality of previously post-processed pixel intensities and a plurality of decompressed pixel intensities;

B) estimating a signal variance based on the local neighborhood of pixels;

C) calculating an optimal filter gain based on the signal variance, the predetermined noise variance, and the predetermined autocorrelation coefficient; and D) determining, using a summer, the post-processed pixel intensity based on the predetermined autocorrelation coefficient, the local neighborhood of pixels, and the optimal filter gain, and wherein the post-processed pixel intensity is further based on an estimate of an intensity of a selected pixel, wherein the post-processed pixel intensity is determined by using an equation of the form:

$$\hat{y}_b(n) = \hat{y}_a(n) + G(n) \cdot [x(n) - \hat{y}_a(n)]$$

where $G(n)$ is the optimal filter gain, $\hat{y}_a(n)$ is the estimate of the intensity of a pixel, and $x(n)$ is a decompressed pixel intensity.

7. A video compression system which includes a post-processing filter for suppressing a visibility of a mosquito artifact and a blocking artifact, the system comprising:

A) a video encoding unit, operably coupled to receive a video sequence, for removing redundant information contained within the video sequence to generate a compressed video stream;

B) a channel encoding unit, operably coupled to the video encoding unit, for encoding the compressed video stream to generate an encoded compressed video stream which is set over a channel;

C) a channel decoding unit, operably coupled through the channel to the channel encoding unit, for decoding the encoded compressed video stream to generate the compressed video stream;

D) a video decoding unit, operably coupled to the channel decoding unit, for generating a decompressed video sequence; and E) a post-processing unit, operably coupled to the video decoding unit, for utilizing a post-processing filter, wherein the post-processing filter removes the mosquito artifact and blocking artifact from the decompressed video sequence based on a predetermined noise variance and a predetermined autocorrelation coefficient to provide a post-processed video sequence, wherein the predetermined noise variance is a value between 1 and 10, by creating a local neighborhood of pixels in a memory unit, based on the decompressed video sequence, wherein the local neighborhood of pixels includes a plurality of previously post-processed pixel intensities and a plurality of decompressed pixel intensities, estimating a signal variance based on the local neighborhood of pixels; calculating an optimal filter gain based on the signal variance, the predetermined noise variance, and the predetermined autocorrelation coefficient; and determining, using a summer, the post-processed pixel intensity based on the predetermined autocorrelation coefficient, the local neighborhood of pixels, and the optimal filter gain, wherein the post-processed pixel intensity is further based on an estimate of an intensity of a selected pixel, wherein the estimate of the intensity of the selected pixel is a function of the predetermined autocorrelation coefficient, a decompressed pixel intensity of a next pixel relative to a predetermined scanning, and direction, and an immediately previously post-processed pixel intensity, and wherein the estimate of the intensity of the selected pixel is determined by using an equation of the form:

$$\hat{y}_a(n) = \frac{\zeta}{1+\zeta^2} \cdot [\hat{y}_b(n-1) + x(n+1)]$$

where $\hat{y}_a(n)$ is the estimate of the intensity of the selected pixel, $\zeta$ is the predetermined autocorrelation coefficient, $x(n+1)$ is a decompressed pixel intensity of a next pixel relative to a predetermined scanning direction, and $\hat{y}_b(n-1)$ is an immediately previously post-processed pixel intensity.

* * * * *